(12) United States Patent
Obara (10) Patent No.: US 6,715,875 B2
(45) Date of Patent: Apr. 6, 2004

(54) ASTIGMATIC-POWER SPECTACLE LENS

(75) Inventor: Yoshimi Obara, Tokyo (JP)

(73) Assignee: PENTAX Corporation, Tokyo (JP)

( * ) Notice: Subject to any disclaimer, the term of this patent is extended or adjusted under 35 U.S.C. 154(b) by 152 days.

(21) Appl. No.: 09/977,705

(22) Filed: Oct. 16, 2001

(65) Prior Publication Data

US 2002/0067463 A1 Jun. 6, 2002

(30) Foreign Application Priority Data

Oct. 17, 2000 (JP) ........................................ 2000-317242

(51) Int. Cl.$^7$ ................................................. G02C 7/02
(52) U.S. Cl. ........................................ 351/159; 351/177
(58) Field of Search .................... 351/159, 41, 158, 351/177, 168, 169, 170

(56) References Cited

U.S. PATENT DOCUMENTS

| | | |
|---|---|---|
| 3,960,442 A | 6/1976 | Davis et al. |
| 5,083,859 A | 1/1992 | Jalie |
| 5,550,600 A | 8/1996 | Ueno |
| 5,767,939 A | 6/1998 | Komatsu et al. |
| 6,012,813 A | 1/2000 | Qi |
| 6,454,408 B1 * | 9/2002 | Morris et al. ............... 351/159 |

FOREIGN PATENT DOCUMENTS

| | | |
|---|---|---|
| EP | 0053780 | 6/1982 |
| WO | 99/23526 | 5/1999 |

* cited by examiner

*Primary Examiner*—Hung Xuan Dang
(74) *Attorney, Agent, or Firm*—Greenblum & Bernstein, P.L.C.

(57) ABSTRACT

Disclosed is a single-vision astigmatic-power spectacle lens having cylindrical power to correct astigmatism of an eye. The spectacle lens has front and back surfaces, one of which is a rotationally-asymmetrical aspherical surface. The rotationally-asymmetrical aspherical surface has a first rotationally-asymmetrical component to add said cylindrical power for correcting astigmatism of an eye and a second rotationally-asymmetrical component to correct the aberrations in the directions between first and second principal meridians caused by adding the cylindrical power. That is, when the sag $z(h, \theta)$ is expressed as a function of the angle $\theta$ while fixing the distance $h$ from the center, a curve of the function has a larger gradient in close to the local maximum and a smaller gradient in close to the local minimum as compared with the curve interpolated by the sine curve.

6 Claims, 13 Drawing Sheets

FIG. 8
ASTIGMATISM
FIRST EMBODIMENT

FIG. 11
ASTIGMATISM
FIRST COMPARATIVE EXAMPLE

FIG. 16
ASTIGMATISM
SECOND EMBODIMENT

FIG. 19
ASTIGMATISM
SECOND COMPARATIVE EXAMPLE

FIG. 18

ASTIGMATIC-POWER SPECTACLE LENS

BACKGROUND OF THE INVENTION

The present invention relates to a single-vision spectacle lens to correct eyesight and particularly, to an astigmatic-power lens having a cylindrical power to correct astigmatism of an eye.

An astigmatic-power lens has a cylindrical power to correct astigmatism of an eye. In a conventional astigmatic-power lens, a front surface (an object side) is a spherical surface or a rotationally-symmetrical aspherical surface and a back surface (an eye side) is processed to be a toric surface to have a difference between the refractive powers in two orthogonal directions in a plane perpendicular to an optical axis, thereby correcting astigmatism.

However, in the above-described conventional astigmatic-power lens, since the rotationally-asymmetrical component to add the cylindrical power is given by the toric surface, a good transmitting optical performance is given in the directions of a first principal meridian along which the minimum surface refractive power is obtained and a second principal meridian along which the maximum surface refractive power is obtained, while a sufficient transmitting optical performance cannot be given in other directions between the first and second principal meridians.

SUMMARY OF THE INVENTION

It is therefore an object of the present invention to provide an astigmatic-power spectacle lens, which is capable of having a sufficient optical performance in any direction even if the lens has a cylindrical power to correct astigmatism of an eye.

For the above object, according to the present invention, there is provided an improved single-vision astigmatic-power spectacle lens to correct eyesight, which includes:

a front surface; and a back surface, wherein at least one of the front and back surfaces is a rotationally-asymmetrical aspherical surface that has a rotationally-asymmetrical component to correct the aberrations in the directions between first and second principal meridians of the rotationally-asymmetrical surface caused by adding the cylindrical power.

With this construction, since at least one of front and back surfaces is a rotationally-asymmetrical surface, the aberration caused by adding the cylindrical power can be corrected.

Further, the rotationally-asymmetrical surface may further include an another rotationally-asymmetrical component to add the cylindrical power for correcting astigmatism of an eye.

When the one surface has two rotationally-asymmetrical components, the other surface may be a rotationally-symmetrical surface, preferably, a spherical surface.

Further, in order to respond to various combinations of spherical power, cylindrical power and cylindrical axis direction, it is desirable that semifinished lens blanks whose front surfaces are finished are stockpiled and a back surface of the selected semifinished lens blank is processed according to the customer's specification in order to shorten delivery times.

The present invention may be also defined as follows. Namely, when a sag $z(h, \theta)$ of the rotationally-asymmetrical surface at a point $(h, \theta)$ with respect to an x-y plane is expressed as a function of the angle $\theta$ while fixing the distance h, the curve of the function has a larger gradient in close to the local maximum and a smaller gradient in close to the local minimum as compared with the curve interpolated by the sine curve in any distances h within the range of $10 \leq h \leq 20$.

The z-axis is a normal to the rotationally-asymmetrical surface at a framing reference point that is the origin of the x-y-z coordinate system and is coincident with a pupil position of a user when the spectacle lens is installed on a frame.

The x-axis is coincident with a first principal meridian of the rotationally-asymmetrical surface along which the minimum surface refractive power is obtained.

The y-axis is coincident with a second principal meridian of the rotationally-asymmetrical surface along which the maximum surface refractive power is obtained.

Symbol h is a distance from the origin in the x-y plane, and $\theta$ is an angle of the line passing the origin and the point $(h, \theta)$ with respect to the x-axis in the x-y plan.

Further, according to another definition, the present invention is characterized in that the following condition (1) is satisfied in any distances h within the range of $10 \leq h \leq 20$:

$$z(h, 45) < \{f(h) + g(h)\}/2 \tag{1}$$

where $f(h)$ is the sag $z(h, 0)$ on the x-axis, and $g(h)$ is the sag $z(h, 90)$ on the y-axis.

When the spectacle lens is a negative lens, it is desirable that the following condition (2) is satisfied in any distances h within the range of $10 \leq h \leq 20$:

$$-0.00010 < [z(h,45) - \{f(h)+g(h)\}/2]/[\{f(h)-g(h)\} \times h \times CYL] < -0.00008 \tag{2}$$

where

CYL (unit: Diopter) is a cylindrical power.

DESCRIPTION OF THE EMBODIMENTS

Figure 1:
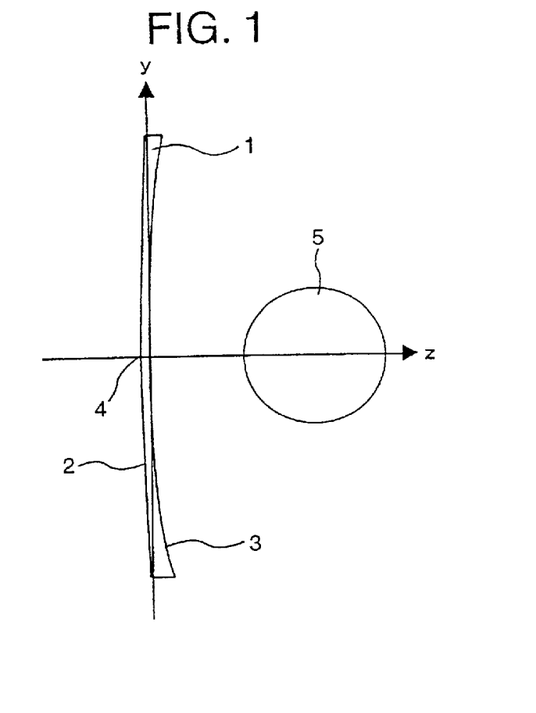
FIG. 1 is a side sectional view of a spectacle lens embodying the invention.
Figure 2:
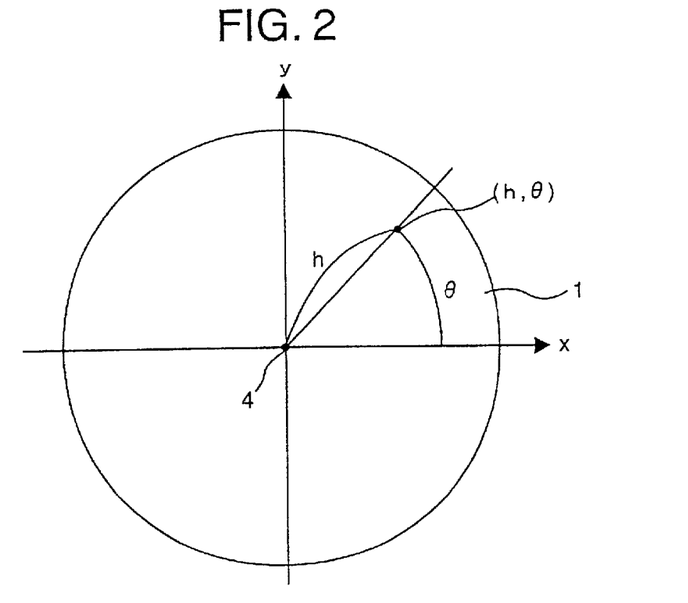
FIG. 2 is a front view of the spectacle lens of FIG. 1.

A single-vision spectacle lens embodying the present invention will be described hereinafter. First, a general construction is described with reference to FIGS. 1 and 2, and then concrete examples will be shown. FIGS. 1 and 2 show a spectacle lens 1 embodying the invention; FIG. 1 is a sectional view and FIG. 2 is a plan view looking from a front surface.

The spectacle lens 1 has a cylindrical power to correct astigmatism of an eye. The front surface 2 of the lens 1 is a spherical surface and the back surface 3 is a rotationally-asymmetrical aspherical surface. On the spectacle lens 1, a framing reference point 4 is defined to be coincident with a pupil position of an eye 5 of a user when the spectacle lens 1 is installed on a frame.

In the drawings, an x-y-z coordinate system whose origin is coincident with the framing reference point 4 is set for defining the back surface 3. The z-axis is a normal to the back surface 3 at the framing reference point 4. The x- and y-axis intersect at a right angle in a plane perpendicular to the z-axis. The x-axis is coincident with a first principal meridian along which the minimum surface refractive power is obtained. The y-axis is coincident with a second principal meridian along which the maximum surface refractive power is obtained.

The back surface 3 has a first rotationally-asymmetrical component to add the cylindrical power for correcting astigmatism of an eye and a second rotationally-asymmetrical component to correct the aberration caused by adding the cylindrical power. The second component corrects aberration in the direction between the directions of the first principal meridian (x-axis) and the second principal meridian (y-axis). Since the back surface 3 has the two rotationally-asymmetrical components, the front surface 2 is not required to have a complex shape, which allows the front surface 2 to be spherical. This eases the making of a semifinished lens blank whose front surface is previously finished.

As shown in FIG. 2, a two dimensional coordinate of a point on the back surface 3 is defined by a polar coordinate (h, θ) where h (unit: mm) is the distance from the z-axis to the point in the x-y plane and θ (unit: degree) is the angle of the line passing the origin and the point with respect to the x-axis in the x-y plane. The sag of the back surface 3 at the point (h, θ) with respect to the x-y plane is expressed by z(h, θ). The sag z(h, 0) on the x-axis is f(h) and the sag z(h, 90) on the y-axis is g(h).

Figure 3:
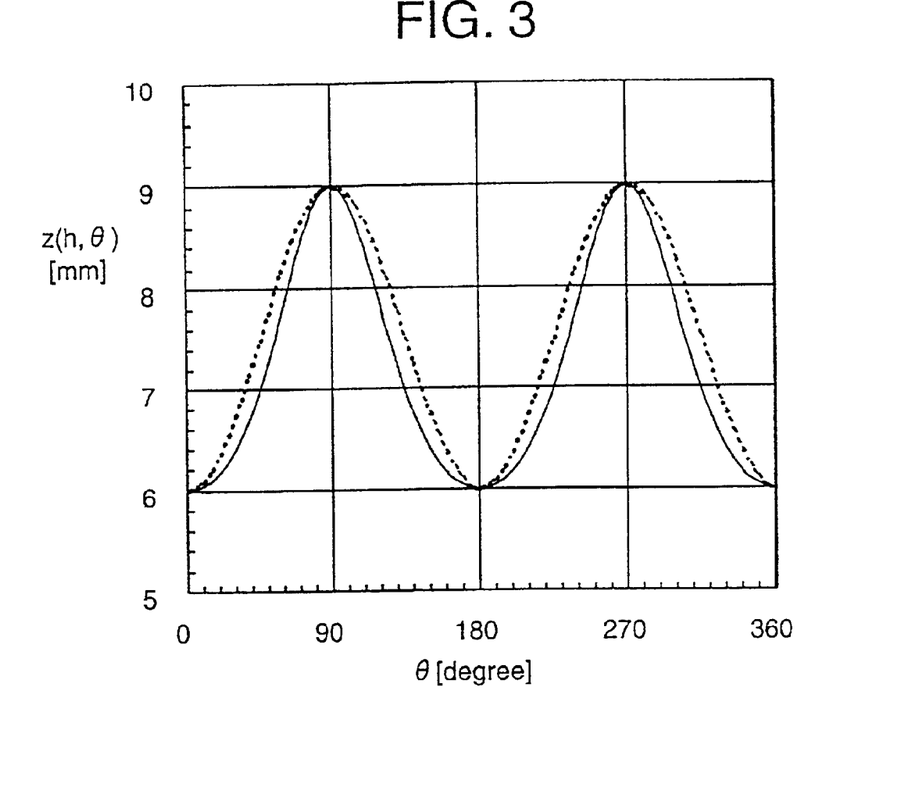
FIG. 3 is a graph showing a sag of a back surface of the lens of FIG. 1 expressed by a function of the angle.

When the sag z(h, θ) is expressed as a function of the angle θ while fixing the distance h, the variation of the sag of the lens surface having the first rotationally-asymmetrical component to add a cylindrical power is like a sine curve as shown in FIG. 3. In FIG. 3, the sag z(20, θ) of the lens whose spherical power (SPH) is 6.00 Diopter, cylindrical power (CYL) is 3.00 Diopter and cylindrical axis direction (AX) is 0°. A solid line in the graph represents the data of the spectacle lens 1 of the embodiment and the dotted line indicates a comparative data where the points between the local maximum and the local minimum are interpolated by a sine curve. The curve of the spectacle lens 1 of the embodiment has a larger gradient in close to the local maximum and a smaller gradient in close to the local minimum as compared with the curve interpolated by the sine curve. While the graph of FIG. 3 shows the case of h=20 only, similar results are obtained in any distance h within the range of 10≦h≦20. The difference between the gradients at the local maximum side and the local minimum side can sufficiently correct the aberrations in the directions between the first and second principal meridians caused by adding the cylindrical power. The difference is the second rotationally-asymmetrical component to correct the aberration caused by adding the cylindrical power. Further, the difference between the sine curve and the function of the embodiment is exaggerated for purpose of illustration in FIG. 3.

The above relationship is numerically expressed as follows. That is, the spectacle lens 1 of the embodiment satisfies the following condition (1) at any distances h within the range of 10≦h≦20.

$$z(h,45)<\{f(h)+g(h)\}/2 \quad (1)$$

When the sag varies along the sine curve, the sag at 45°, which is an intermediate angle between 0° where the local minimum value f(h) is taken and 90° where the local maximum value g(h) is taken, is equal to the average of the local maximum value and the local minimum value. This is the right side of the condition (1). The condition (1) represents that the sag z(h, 45) of the spectacle lens 11 of the embodiment is smaller than the average value described above. When the condition (1) is satisfied, the sag variation of the back surface 3 has a larger gradient in close to the local maximum and a smaller gradient in close to the local minimum as compared with the curve interpolated by the sine curve.

For the spectacle lens having a negative spherical power, the following condition (2) is satisfied at any distance h within the range of 10≦h≦20;

$$-0.00010<[z(h,45)-\{f(h)+g(h)\}/2 \,]/[\{f(h)-g(h)\}\times h\times CYL]<-0.00008 \quad (2)$$

The larger the cylindrical power CYL is, the larger the difference between the local maximum value and the local minimum value is. The condition (2) defines that the magnification of the variation in difference between the sag at 45° and the average value is larger than the magnification of the variation in difference between the local maximum value and the local minimum value. When the condition (2) is satisfied, the aberration can be sufficiently corrected even for the spectacle lens whose cylindrical power is relatively large.

Next, two embodiments of the spectacle lens 1 embodying the present invention will be described. In the following description, two embodiments and two comparative examples will be described as compared with each other.

The sag variation according to the angle θ in each embodiment is not coincident with a sine curve, while that in each comparative example is coincident with a sine curve.

First Embodiment

The spectacle lens of the first embodiment is an astigmatic-power lens having a cylindrical power. Data of the first embodiment is shown in TABLE 1. In the table, SPH denotes a spherical power at a vertex, CYL denotes a cylindrical power, DIA denotes a diameter, CT denotes a center thickness of a lens, N denotes refractive index and $R_1$ denotes radius of curvature of the front surface. Since the back surface is rotationally-asymmetrical, radii of curvature and sags are different between the x- and y-axis directions. $R_{2S}$ and $R_{2C}$ denote radii of curvature of the back surface in the x- and y-axes directions, respectively. Further, the sag f(h) in the x-axis direction and the sag g(h) in the y-axis direction are expressed as follows:

$$f(h) = \frac{h^2}{R_{2S}\left(1 + \sqrt{(1-(1+K_S)(1/R_{2S})^2 h^2)}\right)} +$$
$$A_{4S}h^4 + A_{6S}h^6 + A_{8S}h^8 + A_{10S}h^{10} + A_{12S}h^{12}$$

principal meridian (x-axis) and the second principle meridian (y-axis). In TABLE 2, the points are defined by the two dimensional coordinate, not the polar coordinate. Numerals 0 to 35 in the horizontal axis represent distances from the origin in the x-axis direction, and numerals 0 to 35 in the vertical axis represent distances from the origin in they-axis direction.

The sag of back surface of the spectacle lens according to the first embodiment is determined as follows. Namely, when the sag z(h, θ) is expressed as a function of the angle θ while fixing the distance h, the curve of the sag in the first embodiment has a larger gradient in close to the local maximum and a smaller gradient in close to the local minimum as compared with the curve interpolated by the sine curve for any distance h within the range of 10≦h≦20. Further, TABLE 2 shows the sags within the range of 0≦θ≦90, while the sags within the range of 90 ≦θ≦180 are axially symmetric to the values in TABLE 2 about the y-axis and the sags within the range of 180≦θ≦360 are axially symmetric to the values within the range of 0≦θ≦180 about the x-axis.

TABLE 2

| SAG | 0 | 5 | 10 | 15 | 20 | 25 | 30 | 35 |
|---|---|---|---|---|---|---|---|---|
| 0 | 0.000000 | 0.091744 | 0.363672 | 0.807024 | 1.410464 | 2.163271 | 3.057435 | 4.088614 |
| 5 | 0.167049 | 0.257987 | 0.527925 | 0.968350 | 1.568335 | 2.317581 | 3.208605 | — |
| 10 | 0.666323 | 0.755276 | 1.020979 | 1.455631 | 2.049437 | 2.793451 | 3.682211 | — |
| 15 | 1.493507 | 1.579555 | 1.839526 | 2.266812 | 2.853457 | 3.593174 | 4.485278 | — |
| 20 | 2.645104 | 2.727772 | 2.981801 | 3.402310 | 3.984375 | 4.727036 | — | — |
| 25 | 4.123463 | 4.202986 | 4.453177 | 4.872063 | 5.460559 | — | — | — |
| 30 | 5.949514 | 6.027860 | 6.282184 | 6.716460 | — | — | — | — |
| 35 | 8.204454 | — | — | — | — | — | — | — |

-continued $$g(h) = \frac{h^2}{R_{2C}\left(1 + \sqrt{(1-(1+K_{SC})(1/R_{2C})^2 h^2)}\right)} +$$
$$A_{4C}h^4 + A_{6C}h^6 + A_{8C}h^8 + A_{10C}h^{10} + A_{12C}h^{12}$$

where $K_S$ and $K_C$ are conic constants in the x- and y-axes directions, respectively, $A_{4S}$, $A_{6S}$, $A_{8S}$, $A_{10S}$ and $A_{12S}$ are a spherical surface coefficients in the x-axis direction and $A_{4C}$, $A_{6C}$, $A_{8C}$, $A_{10C}$ and $A_{12C}$ are aspherical surface coefficients in the y-axis direction.

TABLE 1

| SPH | −4.00 [Diopter] | CYL | −4.00 [Diopter] |
|---|---|---|---|
| DIA | 70.0 [mm] | CT | 1.100 [mm] |
| N | 1.665 | | |
| $R_1$ | 742.500 [mm] | | |
| $R_{2S}$ | 135.821 [mm] | $R_{2C}$ | 74.751 [mm] |
| $K_S$ | 0.000 | $K_C$ | 0.000 |
| $A_{4S}$ | −5.18578 × 10$^{-07}$ | $A_{4C}$ | −5.81866 × 10$^{-07}$ |
| $A_{6S}$ | 2.30778 × 10$^{-10}$ | $A_{6C}$ | 2.53653 × 10$^{-10}$ |
| $A_{8S}$ | −8.38783 × 10$^{-14}$ | $A_{8C}$ | −1.66820 × 10$^{-13}$ |
| $A_{10S}$ | 1.59041 × 10$^{-17}$ | $A_{10C}$ | 1.04162 × 10$^{-16}$ |
| $A_{12S}$ | 0.00000 | $A_{12C}$ | 0.00000 |

Figure 4:
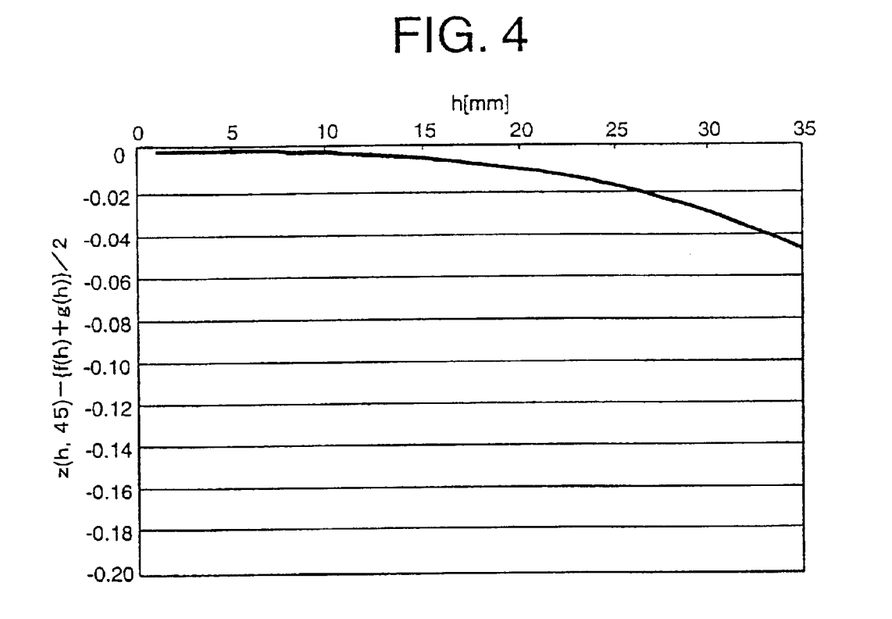
FIG. 4 is a graph showing calculated results about a condition (1) for the spectacle lens of a first embodiment.

TABLE 1 defines the shape of the back surface 3 in the x- and y-axes directions only. TABLE 2 shows the sags of the back surface 3 at the typical points located between the first FIG. 4 is a graph showing calculated results about the condition (1), which is equal to z(h,45)−{f(h)+g(h)}/2, for the spectacle lens of the first embodiment within the range of 0≦h≦35 mm. The graph shows that the values are minus within the range of 10≦h≦20 mm and thus the first embodiment satisfies the condition (1).

Figure 5:
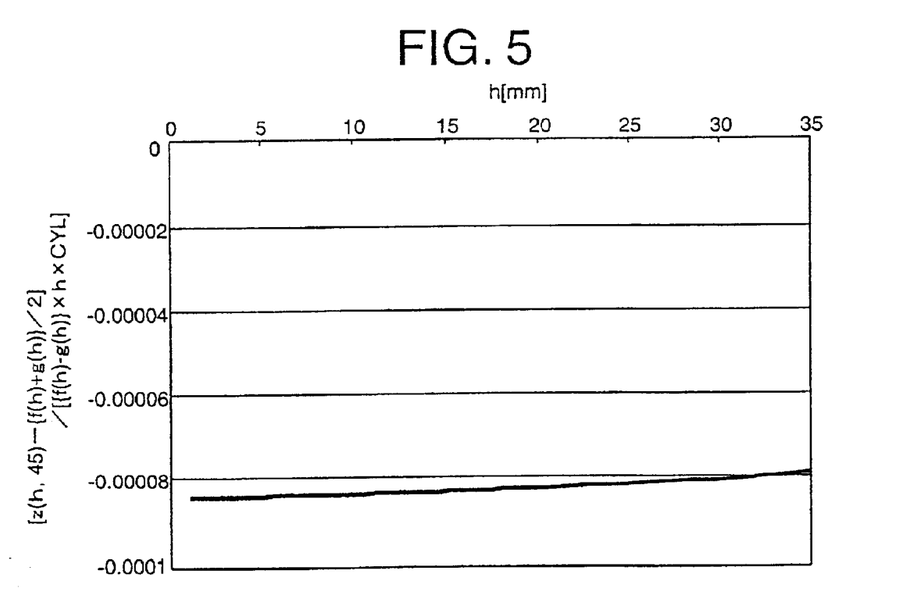
FIG. 5 is a graph showing calculated results about a condition (2) for the spectacle lens of the first embodiment.

Further, FIG. 5 is a graph showing calculated results about the condition (2) within the range of 0≦h≦35 mm. The graph shows that the values of intermediate terms of the condition (2) fall within the range between −0.00010 and −0.00008 and thus the first embodiment satisfies the condition (2).

Figure 6:
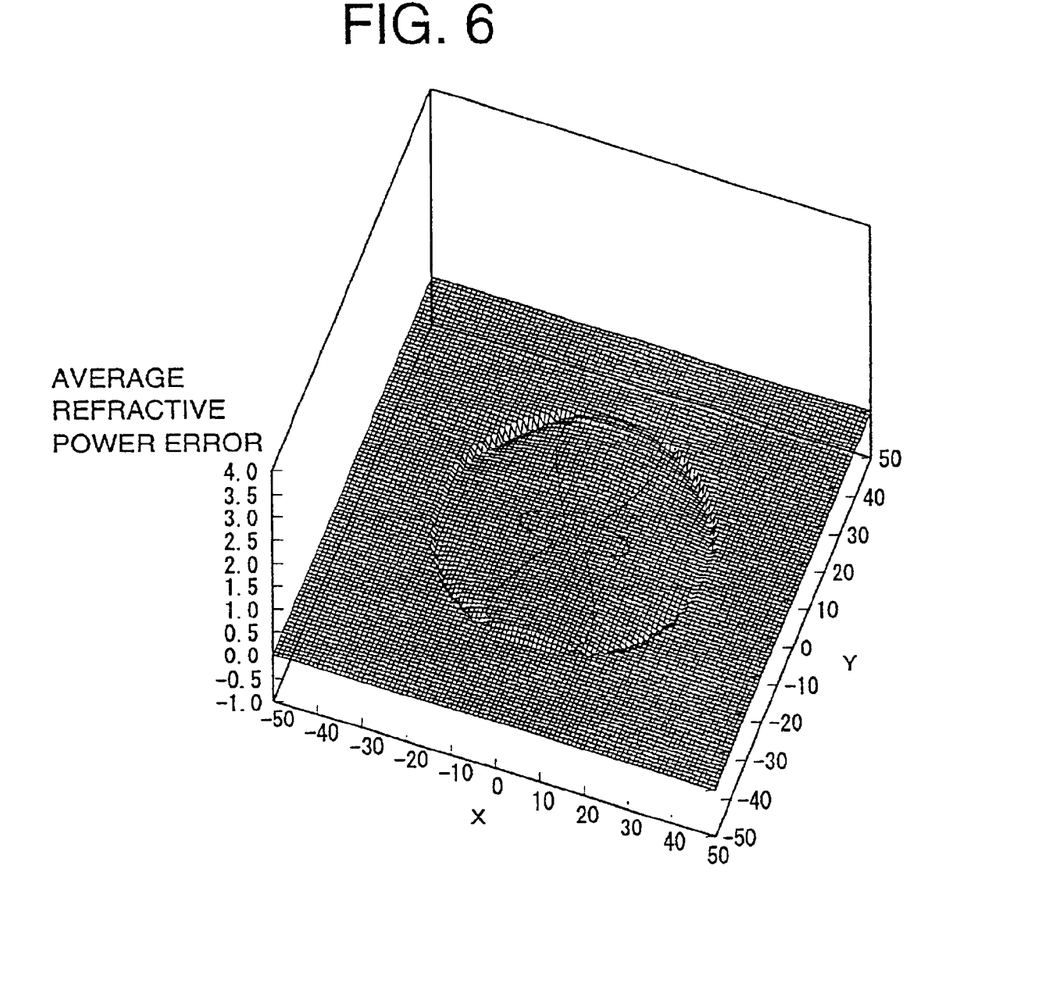
FIG. 6 is a three-dimension graph showing an average refractive power error of the spectacle lens of the first embodiment.
Figure 7:
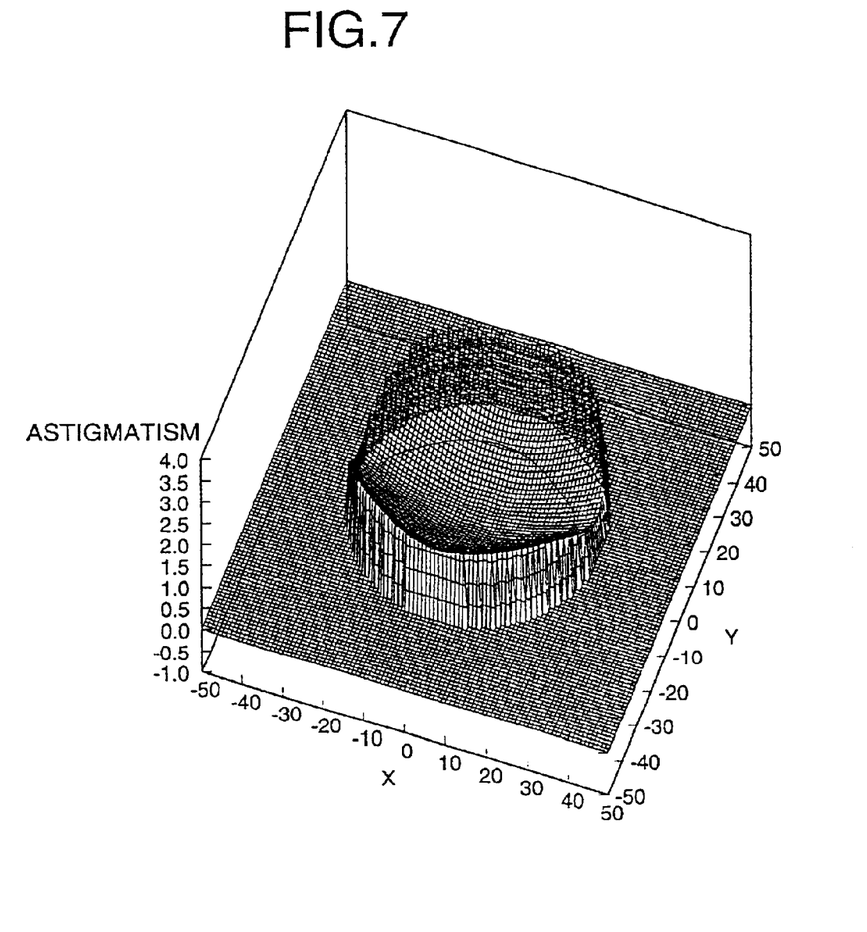
FIG. 7 is a three-dimensional graph showing astigmatism of the spectacle lens of the first embodiment.
Figure 8:
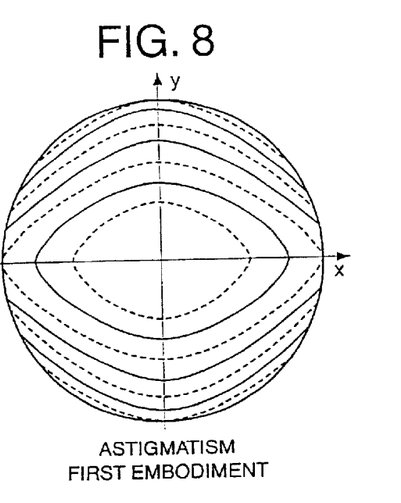
FIG. 8 is a two-dimensional distribution map showing astigmatism of the spectacle lens of the first embodiment.

FIGS. 6 and 7 are three-dimensional graphs showing transmitting optical performances of the first embodiment; FIG. 6 shows an average refractive power error and FIG. 7 shows astigmatism of the spectacle lens. In the graphs, plane coordinates represent the distances (unit: mm) of a position on the lens surface from the origin in the x-axis and y-axis, respectively, the vertical axis represents amount of aberration (unit: Diopter). FIG. 8 is a two-dimensional distribution map showing the astigmatism shown in FIG. 7.

First Comparative Example

The spectacle lens of the first comparative example is an astigmatic-power lens that has the same specification (SPH and CYL) as the first embodiment and the distribution of the sag of the back surface of the first comparative example is shown in TABLE 3.

TABLE 3

| SAG | 0 | 5 | 10 | 15 | 20 | 25 | 30 | 35 |
|---|---|---|---|---|---|---|---|---|
| 0 | 0.000000 | 0.091744 | 0.363669 | 0.807007 | 1.410409 | 2.163138 | 3.057159 | 4.088100 |
| 5 | 0.167050 | 0.258347 | 0.529061 | 0.970756 | 1.572511 | 2.324034 | 3.217880 | — |
| 10 | 0.666326 | 0.756419 | 1.023865 | 1.461152 | 2.058582 | 2.807272 | 3.701896 | — |
| 15 | 1.493525 | 1.581995 | 1.845074 | 2.276612 | 2.868903 | 3.615849 | 4.517090 | — |
| 20 | 2.645158 | 2.732056 | 2.991048 | 3.417831 | 4.007900 | 4.760694 | — | — |
| 25 | 4.123596 | 4.209704 | 4.467257 | 4.894968 | 5.494374 | — | — | — |
| 30 | 5.949790 | 6.037685 | 6.302413 | 6.748791 | — | — | — | — |
| 35 | 8.204968 | — | — | — | — | — | — | — |

When the sag $z(h, \theta)$ is expressed as a function of the angle $\theta$ while fixing the distance h, the sags at the points between the local maximum and the local minimum are interpolated by the sine curve. That is a difference between the first embodiment and the first comparative example.

Accordingly, the first comparative example does not satisfy the condition (1) because the value of $z(h,45)-\{f(h)+g(h)\}/2$ equals 0, and the condition (2) is not satisfied because the value of the intermediate term of the condition (2) equals 0.

Figure 9:
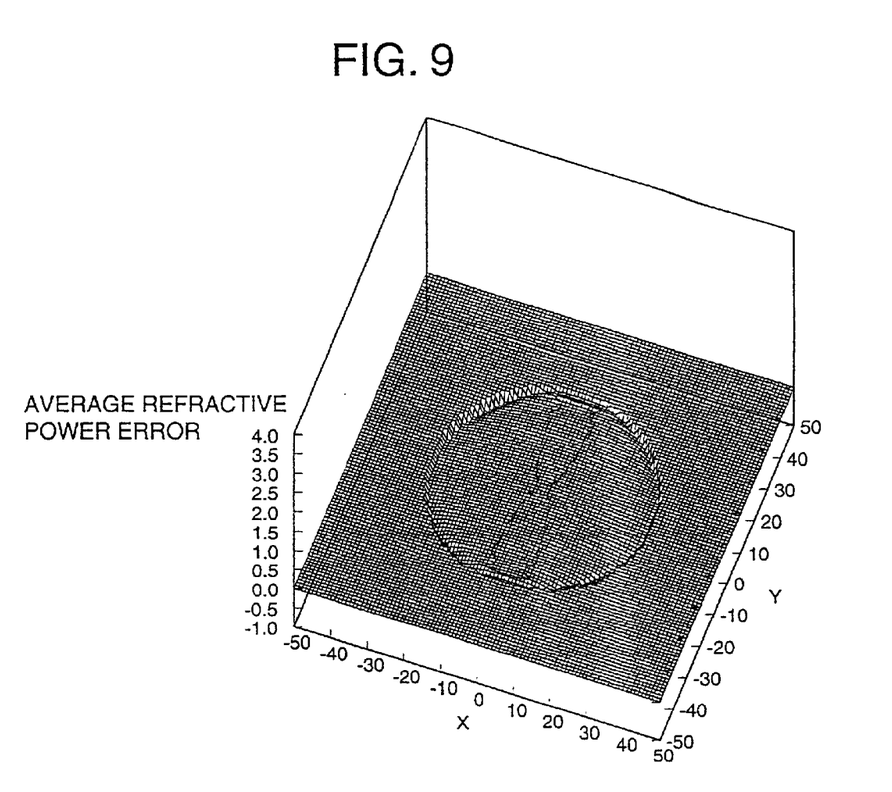
FIG. 9 is a three-dimension graph showing an average refractive power error of the spectacle lens of a first comparative example.
Figure 10:
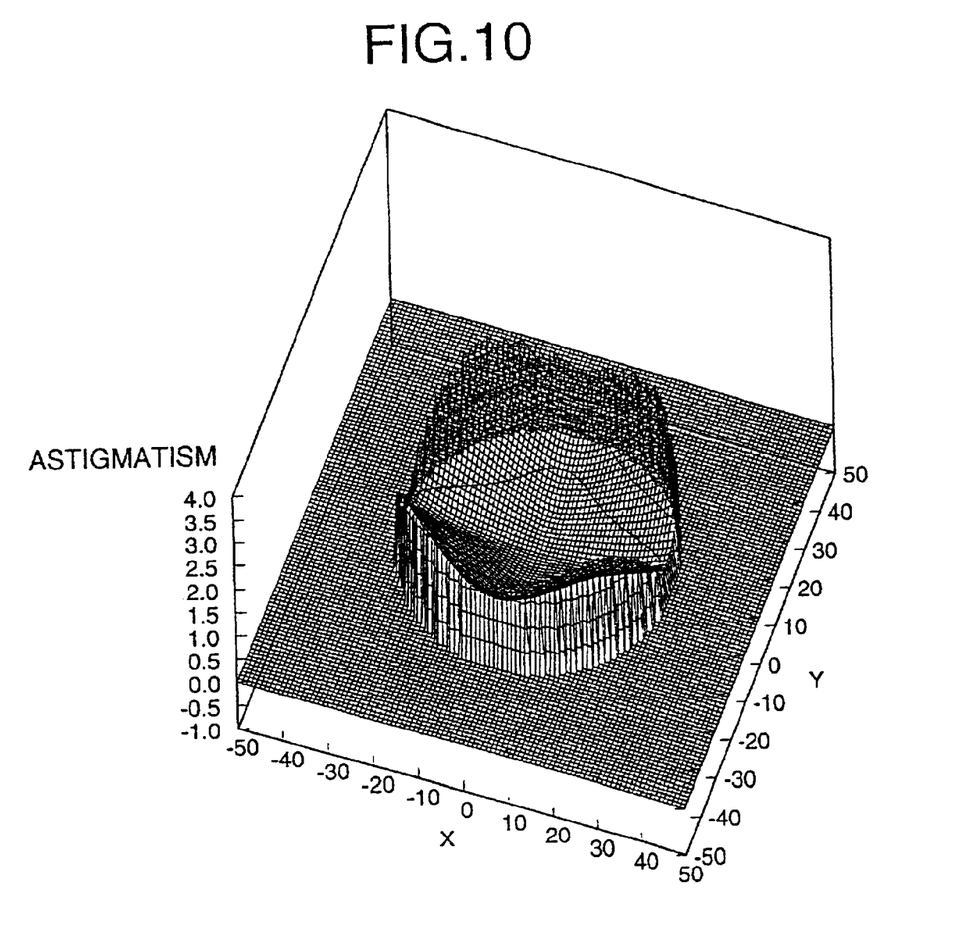
FIG. 10 is a three-dimensional graph showing astigmatism of the spectacle lens of the first comparative example.
Figure 11:
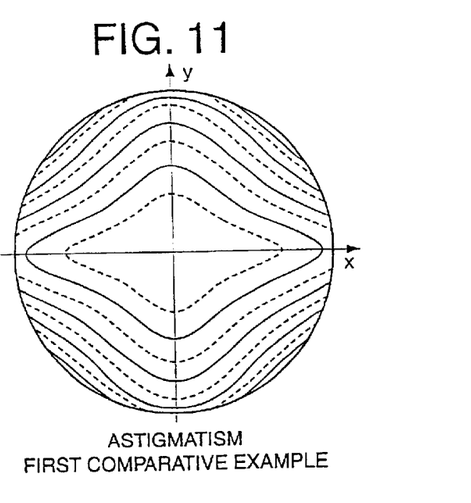
FIG. 11 is a two-dimensional distribution map showing astigmatism of the spectacle lens of the first comparative example.

FIGS. 9 and 10 are three-dimensional graphs showing transmitting optical performances of the first comparative example; FIG. 9 shows an average refractive power error and FIG. 10 shows astigmatism of the spectacle lens. FIG. 11 is a two-dimensional distribution map showing the astigmatism shown in FIG. 10.

Compared with FIGS. 6 to 8, in the first comparative example, the contour lines of the astigmatism bend inside in the directions between the first and second principal meridians, which results in unnatural defocusing on the periphery of the view field. In the first embodiment, the contour lines of the astigmatism are almost oval, which results in natural defocusing.

Second Embodiment

A spectacle lens of the second embodiment is an astigmatic-power lens having a cylindrical power and the specification thereof is shown in TABLE 4.

TABLE 4

| SPH | −2.00 [Diopter] | CYL | −2.00 [Diopter] |
|---|---|---|---|
| DIA | 75.0 [mm] | CT | 1.100 [mm] |
| N | 1.665 | | |
| $R_1$ | 370.000 [mm] | | |
| $R_{2S}$ | 175.026 [mm] | $R_{2C}$ | 114.666 [mm] |
| $K_S$ | 0.000 | $K_C$ | 0.000 |
| $A_{4S}$ | $-2.68725 \times 10^{-07}$ | $A_{4C}$ | $-4.15750 \times 10^{-07}$ |
| $A_{6S}$ | $1.31953 \times 10^{-10}$ | $A_{6C}$ | $2.05382 \times 10^{-10}$ |
| $A_{8S}$ | $-4.59128 \times 10^{-14}$ | $A_{8C}$ | $-7.49654 \times 10^{-14}$ |
| $A_{10S}$ | $7.53092 \times 10^{-18}$ | $A_{10C}$ | $1.60702 \times 10^{-17}$ |
| $A_{12S}$ | 0.00000 | $A_{12C}$ | 0.00000 |

TABLE 4 defines the shape of the back surface in the x- and y-axes directions only. TABLE 5 shows the sags of the back surface at the typical points located between the first principal meridian (x-axis) and the second principle meridian (y-axis).

The sag of back surface of the spectacle lens according to the second embodiment is determined as follows. Namely, when the sag $z(h, \theta)$ is expressed as a function of the angle $\theta$ while fixing the distance h, the curve of the sag in the first embodiment has a larger gradient in close to the local maximum and a smaller gradient in close to the local minimum as compared with the curve interpolated by the sine curve for any distance h within the range of $10 \leq h \leq 20$. Further, the sags within the range of $90 \leq \theta \leq 360$ can be obtained in the same manner as described in the first embodiment.

TABLE 5

| SAG | 0 | 5 | 10 | 15 | 20 | 25 | 30 | 35 |
|---|---|---|---|---|---|---|---|---|
| 0 | 0.000000 | 0.071267 | 0.283346 | 0.631734 | 1.110801 | 1.715626 | 2.443103 | 3.291949 |
| 5 | 0.108807 | 0.179631 | 0.390547 | 0.737250 | 1.214396 | 1.817323 | 2.543088 | — |
| 10 | 0.432921 | 0.502594 | 0.710655 | 1.053355 | 1.526109 | 2.124957 | 2.847426 | — |
| 15 | 0.966451 | 1.034497 | 1.238664 | 1.576016 | 2.043028 | 2.636714 | 3.355327 | — |
| 20 | 1.702529 | 1.768795 | 1.968903 | 2.300817 | 2.762168 | 3.351076 | — | — |
| 25 | 2.636301 | 2.700920 | 2.897606 | 3.225169 | 3.682370 | — | — | — |
| 30 | 3.767231 | 3.830551 | 4.025093 | 4.350463 | — | — | — | — |
| 35 | 5.101280 | — | — | — | — | — | — | — |

Figure 12:
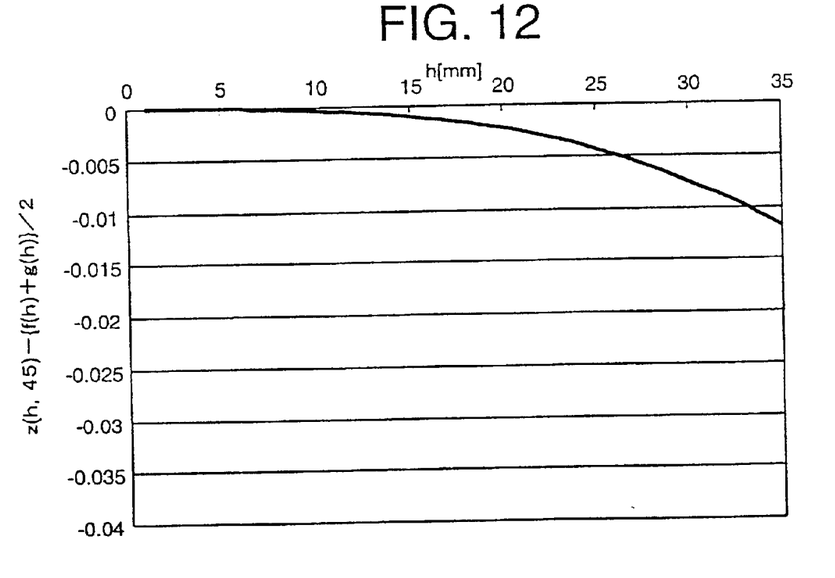
FIG. 12 is a graph showing calculated results about a condition (1) for the spectacle lens of a second embodiment.

FIG. 12 is a graph showing calculated results about the condition (1), which is equal to $z(h,45)-\{f(h)+g(h)\}/2$, for the spectacle lens of the second embodiment within the range of $0 \leq h \leq 35$ mm. The graph shows that the values are minus within the range of $10 \leq h \leq 20$ mm and thus the second embodiment satisfies the condition (1).

Figure 13:
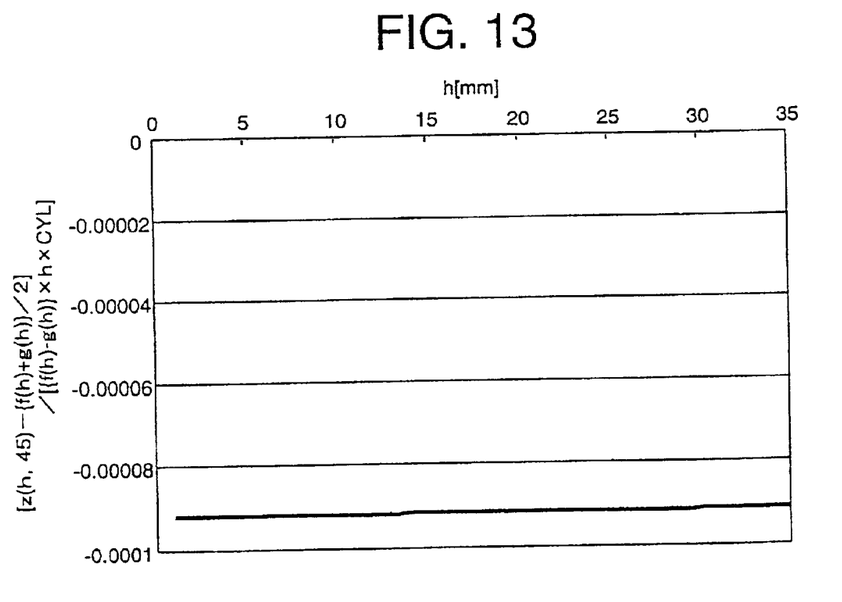
FIG. 13 is a graph showing calculated results about a condition (2) for the spectacle lens of the second embodiment.

Further, FIG. 13 is a graph showing calculated results about the condition (2) within the range of $0 \leq h \leq 35$ mm. The graph shows that the values of intermediate terms of the condition (2) fall within the range between −0.00010 and −0.00008 and thus second embodiment satisfies the condition (2).

Figure 14:
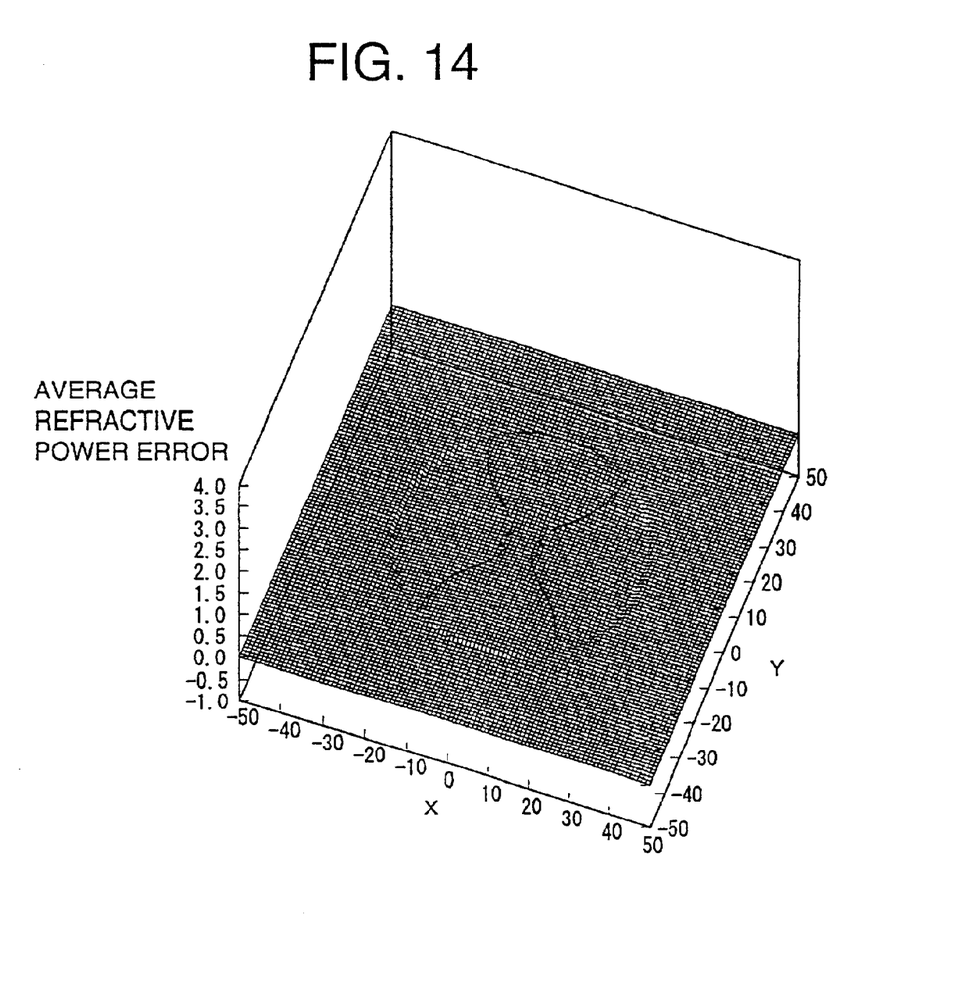
FIG. 14 is a three-dimension graph showing an average refractive power error of the spectacle lens of the second embodiment.
Figure 15:
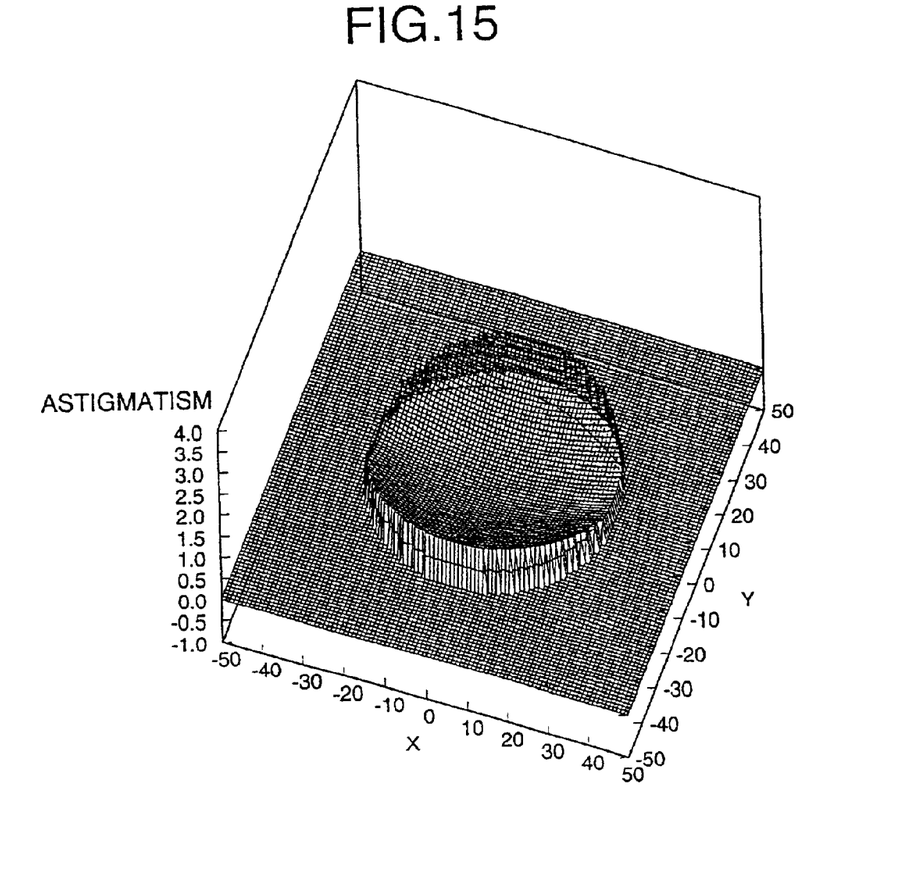
FIG. 15 is a three-dimensional graph showing astigmatism of the spectacle lens of the second embodiment.
Figure 16:
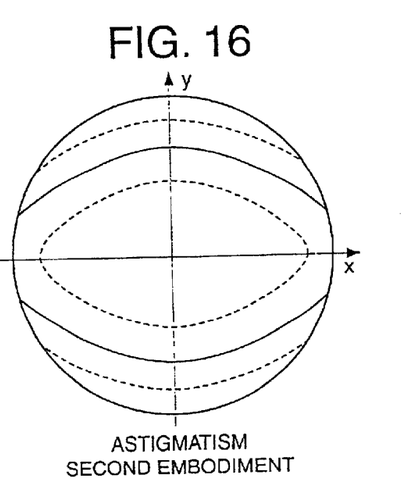
FIG. 16 is a two-dimensional distribution map showing astigmatism of the spectacle lens of the second embodiment.

FIGS. 14 and 15 are three-dimensional graphs showing transmitting optical performances of the second embodiment; FIG. 14 shows an average refractive power error and FIG. 15 shows astigmatism of the spectacle lens. FIG. 16 is a two-dimensional distribution map showing the astigmatism shown in FIG. 15.

Second Comparative Example

The spectacle lens of the second comparative example is astigmatic-power lens that has the same specification (SPH CYL) as the second embodiment and the distribution of the of the back surface of the first comparative example is shown in TABLE 6.

TABLE 6

| SAG | 0 | 5 | 10 | 15 | 20 | 25 | 30 | 35 |
|-----|---|---|----|----|----|----|----|----|
| 0 | 0.000000 | 0.071267 | 0.283346 | 0.631732 | 1.110793 | 1.715607 | 2.443063 | 3.291876 |
| 5 | 0.108807 | 0.179728 | 0.390852 | 0.737894 | 1.215504 | 1.819020 | 2.545500 | — |
| 10 | 0.432922 | 0.502901 | 0.711427 | 1.054821 | 1.528517 | 2.128560 | 2.852484 | — |
| 15 | 0.966453 | 1.035145 | 1.240134 | 1.578597 | 2.047064 | 2.642573 | 3.363406 | — |
| 20 | 1.702537 | 1.769919 | 1.971326 | 2.304863 | 2.768250 | 3.359667 | — | — |
| 25 | 2.636320 | 2.702655 | 2.901247 | 3.231062 | 3.690984 | — | — | — |
| 30 | 3.767271 | 3.833042 | 4.030230 | 4.358616 | — | — | — | — |
| 35 | 5.101354 | — | — | — | — | — | — | — |

When the sag $z(h, \theta)$ is expressed as a function of the angle $\theta$ while fixing the distance h, the sags at the points between local maximum and the local minimum are interpolated by the sine curve. That is a difference between the second embodiment and the second comparative example.

Accordingly, the second comparative example does not satisfy the condition (1) because the value of $z(h,45)-\{(f(h)+g(h)\}/2$ equals 0, and the condition (2) is not satisfied because the value of the intermediate term of the condition (2) equals 0.

Figure 17:
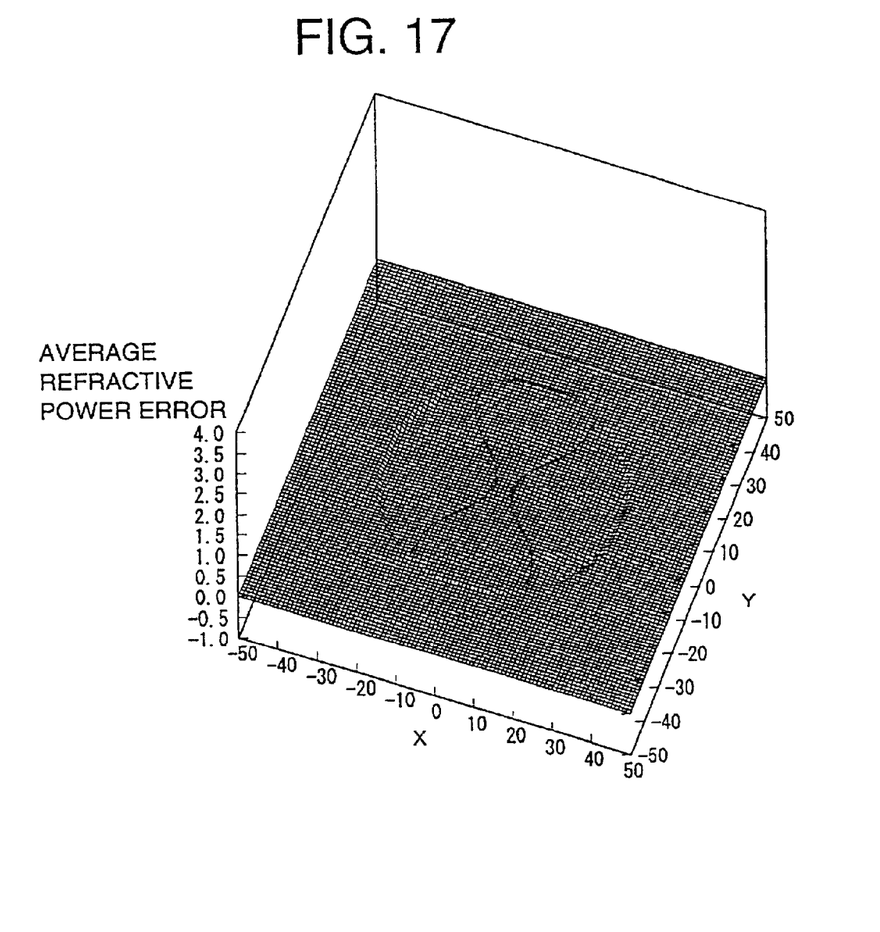
FIG. 17 is a three-dimension graph showing an average refractive power error of the spectacle lens of a second comparative example.
Figure 18:
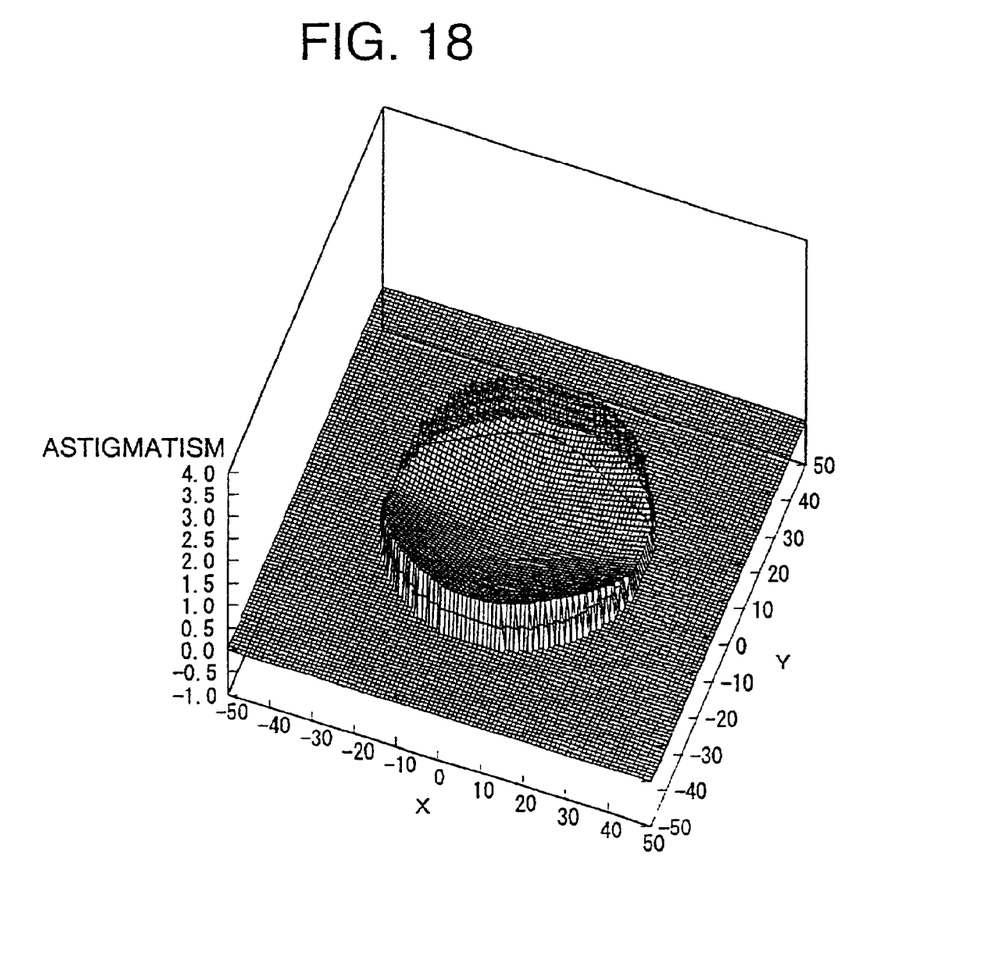
FIG. 18 is a three-dimensional graph showing astigmatism of the spectacle lens of the second comparative example.
Figure 19:
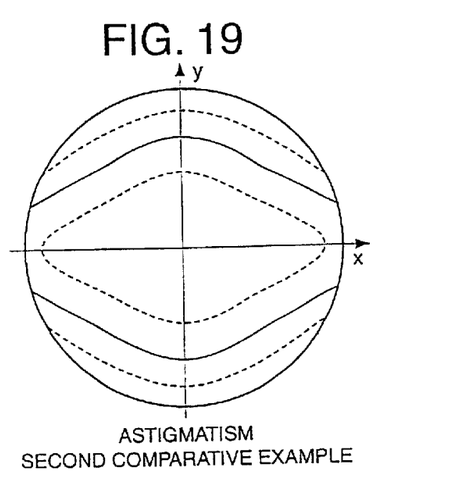
FIG. 19 is a two-dimensional distribution map showing astigmatism of the spectacle lens of the second comparative example.

FIGS. 17 and 18 are three-dimensional graphs showing transmitting optical performances of the second comparative example; FIG. 17 shows an average refractive power error and FIG. 18 shows astigmatism of the spectacle lens. FIG. 19 is a two-dimensional distribution map showing the astigmatism shown in FIG. 18.

Compared with FIGS. 14 to 16, in the second comparative example, the contour lines of the astigmatism form rhombuses, which results in unnatural defocusing on the periphery of the view field. In the second embodiment, the contour lines of the astigmatism are almost oval, which results in a natural defocusing.

As described above, according to the present invention, since the gradients of the curve, which expresses the sag as a function of an angle, are different between the local maximum side and the local minimum side, the astigmatism in the directions between the first and second principal meridians are well balanced, which results natural view field.

The present disclosure relates to the subject matter contained in Japanese Patent Application No. 2000-317242, filed on Oct. 17, 2000, which is expressly incorporated herein by reference in its entirety.

What is claimed is:

1. A single-vision astigmatic-power spectacle lens having a cylindrical power to correct astigmatism of an eye comprising:
    a front surface; and
    a back surface,
    wherein at least one of said front and back surfaces is a rotationally-asymmetrical aspherical surface that has a rotationally-asymmetrical component to correct the aberrations in the directions between first and second principal meridians caused by adding said cylindrical power.

2. The single-vision astigmatic-power spectacle lens according to claim 1, wherein said rotationally-asymmetrical aspherical surface further includes another rotationally-asymmetrical component to add said cylindrical power for correcting astigmatism of an eye.

3. The single-vision astigmatic-power spectacle lens according to claim 1, wherein said front surface is spherical and said back surface is rotationally-asymmetrical.

4. A single-vision astigmatic-power spectacle lens having a cylindrical power to correct astigmatism of an eye comprising:
    a front surface; and
    a back surface,
    wherein at least one of said front and back surface is a rotationally-asymmetrical aspherical surface and wherein when a sag $z(h, \theta)$ of said rotationally-asymmetrical surface at a point $(h, \theta)$ with respect to an x-y plane is expressed as a function of the angle $\theta$ while fixing the distance h, the curve of said function has a larger gradient in close to the local maximum and a smaller gradient in close to the local minimum as compared with the curve interpolated by the sine curve in any distance h within the range of $10 \leq h \leq 20$,
    where
        the z-axis is a normal to said rotationally-asymmetrical surface at a framing reference point that is the origin of the x-y-z coordinate system and is coincident with a pupil position of a user when the spectacle lens is installed on a frame,
        the x-axis is coincident with a first principal meridian of said rotationally-asymmetrical surface along which the minimum surface refractive power is obtained,
        the y-axis is coincident with a second principal meridian of said rotationally-asymmetrical surface along which the maximum surface refractive power is obtained,
        h is a distance from said origin in the x-y plane, and
        $\theta$ is an angle of the line passing said origin and said point $(h, \theta)$ with respect to the x-axis in the x-y plane.

5. A single-vision astigmatic-power spectacle lens having a cylindrical power to correct astigmatism of an eye comprising:
    a front surface; and
    a back surface,
    wherein at least one of said front and back surface is a rotationally-asymmetrical aspherical surface and wherein the following condition (1) is satisfied at any distance h within the range of $10 \leq h \leq 20$, $$z(h,45)<\{f(h)+g(h)\}/2 \qquad (1)$$

where
    the z-axis is a normal to said rotationally-asymmetrical surface at a framing reference point that is the origin of the x-y-z coordinate system and is coincident with a framing reference point that is coincident with a pupil position of a user when the spectacle lens is installed on a frame, the x-axis is coincident with a first principal meridian of said rotationally-asymmetrical surface along which the minimum surface refractive power is obtained, the y-axis is coincident with a second principal meridian of said rotationally-asymmetrical surface along which the maximum surface refractive power is obtained, h (unit: mm) is a distance from said origin in the x-y plane, θ (unit: degree) is an angle of the line passing said origin and said point (h, θ) with respect to the x-axis in the x-y plane, z(h, θ) is the sag of said rotationally-asymmetrical surface at a point (h, θ) with respect to the x-y plane, f(h) is the sag z(h, 0) on the x-axis, and g(h) is the sag z(h, 90) on the y-axis.

6. The single-vision astigmatic-power spectacle lens according to claim 5, wherein the spherical power is negative and the following condition (2) is satisfied at any distance h within the range $10 \leq h \leq 20$;

$$-0.00010 < [z(h,45) - \{f(h)+g(h)\}/2]/[\{f(h)-g(h)\} \times h \times CYL] < -0.00008 \quad (2)$$

where

CYL (unit: Diopter) is a cylindrical power.

* * * * *